(12) United States Patent
Xu

(10) Patent No.: US 12,016,026 B2
(45) Date of Patent: Jun. 18, 2024

(54) TRANSMISSION RESOURCE DETERMINING METHOD AND APPARATUS, AND TERMINAL DEVICE

(71) Applicant: GUANGDONG OPPO MOBILE TELECOMMUNICATIONS CORP., LTD., Guangdong (CN)

(72) Inventor: Weijie Xu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 633 days.

(21) Appl. No.: 17/150,535

(22) Filed: Jan. 15, 2021

(65) Prior Publication Data

US 2021/0136809 A1  May 6, 2021

Related U.S. Application Data

(63) Continuation of application No. PCT/CN2019/081848, filed on Apr. 9, 2019.

(30) Foreign Application Priority Data

Jul. 27, 2018 (CN) .......................... 201810848244.3
Aug. 1, 2018 (CN) .......................... 201810866001.2

(51) Int. Cl.
*H04W 72/23* (2023.01)
*H04W 24/08* (2009.01)
(Continued)

(52) U.S. Cl.
CPC .......... *H04W 72/23* (2023.01); *H04W 24/08* (2013.01); *H04W 72/0446* (2013.01); *H04W 72/0453* (2013.01); *H04W 72/535* (2023.01)

(58) Field of Classification Search
CPC ............ H04W 24/08; H04W 72/0446; H04W 72/0453; H04W 72/12; H04W 72/23; H04W 72/535; H04W 72/542
See application file for complete search history.

(56) References Cited

U.S. PATENT DOCUMENTS 8,520,623 B2 *  8/2013  Cho ...................... H04L 5/0007
                                                    455/434
10,231,236 B2 *  3/2019  Dinan ................... H04W 72/23
(Continued)

FOREIGN PATENT DOCUMENTS

CN           107872891 A       4/2018

OTHER PUBLICATIONS

International Search Report with English Translation for PCT/CN2019/081848 dated Jun. 28, 2019.
(Continued)

*Primary Examiner* — Jean A Gelin
(74) *Attorney, Agent, or Firm* — Young Basile Hanlon & MacFarlane, P.C.

(57) ABSTRACT

Embodiments of the present application provide a transmission resource determining method and apparatus, and a terminal device. The method comprises: a terminal device determines, on the basis of the bandwidth of a first control resource set or the bandwidth of a first indication signal, a first receiving bandwidth corresponding to a downlink signal, wherein the first control resource set is used for transmitting a downlink control channel, and the first indication signal is used for indicating that the terminal device determines whether to monitor the downlink control channel at a downlink control channel monitoring moment.

25 Claims, 5 Drawing Sheets

(51) Int. Cl.
*H04W 72/0446* (2023.01)
*H04W 72/0453* (2023.01)
*H04W 72/50* (2023.01)

(56) References Cited

U.S. PATENT DOCUMENTS

| | | | |
|---|---|---|---|
| 10,455,579 B2* | 10/2019 | Takeda | H04W 74/08 |
| 10,873,976 B2* | 12/2020 | Cirik | H04W 74/0833 |
| 2005/0207335 A1* | 9/2005 | Schmidl | H04L 1/1845 |
| | | | 370/206 |
| 2006/0274679 A1* | 12/2006 | Khandekar | H04L 5/1461 |
| | | | 370/278 |
| 2011/0116439 A1* | 5/2011 | Kawasaki | H04L 5/0044 |
| | | | 370/492 |
| 2012/0257588 A1* | 10/2012 | Umeda | H04L 5/143 |
| | | | 370/329 |
| 2015/0049699 A1* | 2/2015 | Takeda | H04W 72/542 |
| | | | 370/329 |
| 2015/0327224 A1* | 11/2015 | Guan | H04L 5/0073 |
| | | | 370/329 |
| 2016/0081065 A1* | 3/2016 | Shi | H04L 5/0055 |
| | | | 370/329 |
| 2017/0302427 A1* | 10/2017 | Stattin | H04L 5/0053 |
| 2018/0332505 A1* | 11/2018 | Kim | H04L 5/0064 |
| 2019/0021045 A1* | 1/2019 | Kim | H04W 48/12 |
| 2019/0052447 A1* | 2/2019 | Wan | H04W 72/0446 |
| 2019/0090299 A1* | 3/2019 | Ang | H04W 52/0229 |
| 2019/0239215 A1* | 8/2019 | Lin | H04L 5/0048 |
| 2019/0297603 A1* | 9/2019 | Guo | H04L 5/0053 |
| 2019/0313437 A1* | 10/2019 | Jung | H04L 5/0042 |
| 2019/0349147 A1* | 11/2019 | Aiba | H04L 5/0094 |
| 2019/0356524 A1* | 11/2019 | Yi | H04L 27/26025 |
| 2020/0015235 A1* | 1/2020 | Takeda | H04B 7/0456 |
| 2020/0015262 A1* | 1/2020 | Ahn | H04J 11/0076 |
| 2020/0022121 A1* | 1/2020 | Li | H04L 5/0094 |
| 2020/0119858 A1* | 4/2020 | Ren | H04W 72/12 |
| 2020/0280970 A1* | 9/2020 | Takeda | H04L 5/0098 |
| 2021/0045119 A1* | 2/2021 | Song | H04W 72/0453 |
| 2023/0309135 A1* | 9/2023 | Lindoff | H04L 5/001 |

OTHER PUBLICATIONS

3GPP TSG RAN WG1 Meeting NR#3; Nagoya, Japan, Sep. 18-21, 2017; R1-1716647.

InterDigital Inc., CO RESET Monitoring Under Dynamic Change of BWP, 3GPP TSG RAN WGI NR Ad-Hoc #2, RI-1710872, Jun. 27-30, 2017. (5 pages).

Interdigital, Inc., Remaining details of BWP, 3GPP TSG RAN WGI Meeting AH_NR#3, RI-1718365 (RI-1716258), Oct. 9-13, 2017. (6 pages).

Qualcomm Incorporated, Open Issues on BWP, 3GPP TSG RAN WG1 #91, R1-1720693, Nov. 27-Dec. 1, 2017. (15 pages).

Extended European Search Report for EP Application 19841908.7 dated Aug. 5, 2021. (10 pages).

Communication pursuant to Article 94(3) EPC for EP Application 19841908.7 dated Jul. 14, 2023. (8 pages).

Media Tek Inc., Remaining Details on Bandwidth Part Operation in NR, 3GPP TSG RAN WG1 Meeting 90bis, R1-1718327, Oct. 9-13, 2017. (13 pages).

* cited by examiner

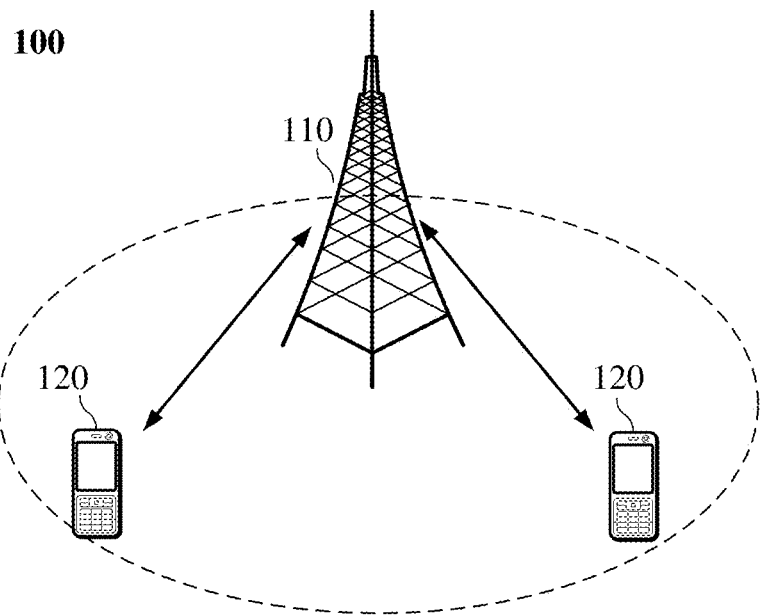

FIG. 1

A terminal device determines a first receiving bandwidth corresponding to a downlink signal based on a bandwidth of a first control resource set or a bandwidth of a first indication signal, wherein the first control resource set is used for transmitting a downlink control channel, and the first indication signal is used for the terminal device to determine whether to monitor the downlink control channel at a downlink control channel monitoring moment

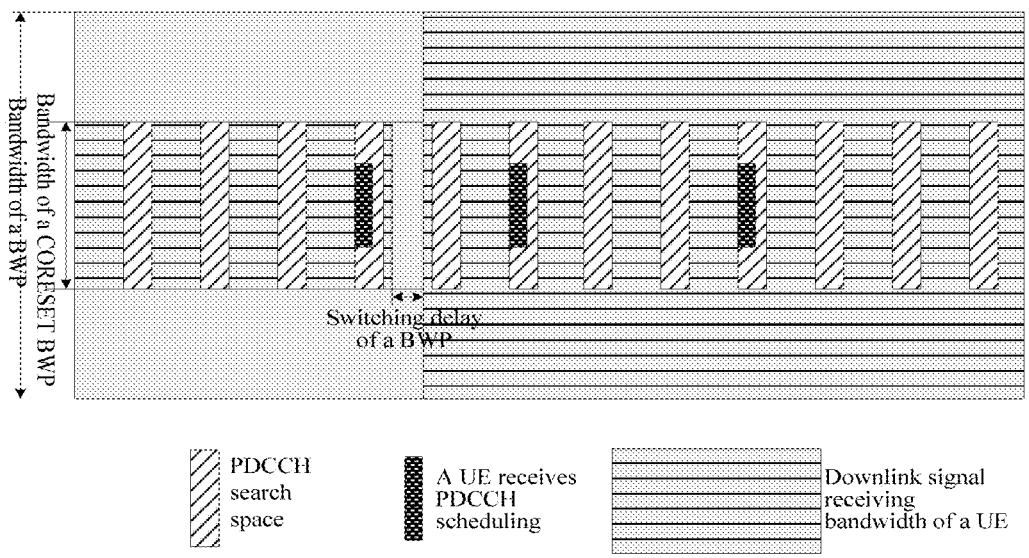

FIG. 3

A terminal device determines whether to receive a second carrier based on a first downlink control channel or a first indication signal on a first carrier, wherein the first downlink control channel is able to schedule a data channel on the second carrier, the first indication signal is used for indicating whether the terminal device monitors a second downlink control channel, and the second downlink control channel is used for scheduling the data channel on the second carrier — 801

FIG. 8

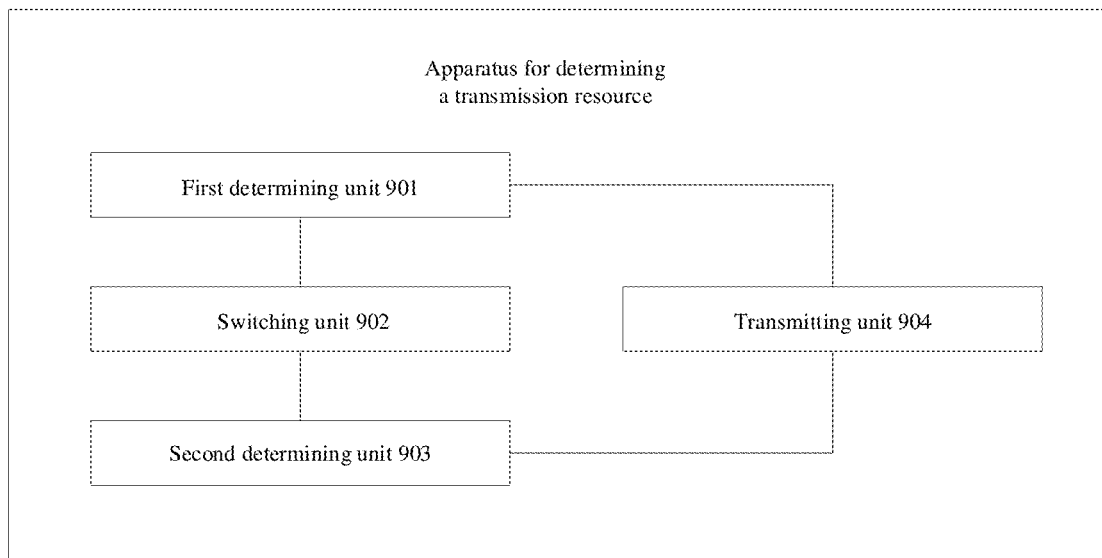

FIG. 9

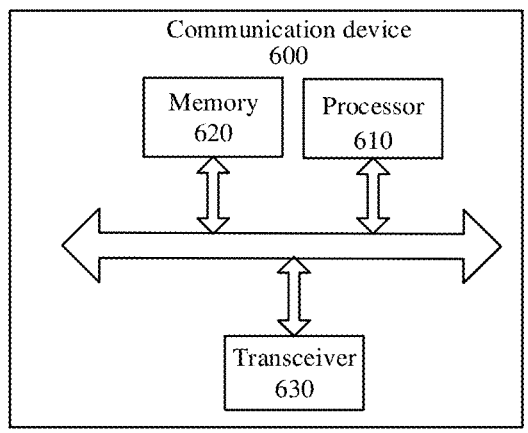

FIG. 10

TRANSMISSION RESOURCE DETERMINING METHOD AND APPARATUS, AND TERMINAL DEVICE

CROSS-REFERENCE TO RELATED APPLICATION(S)

This application is a continuation application of International PCT Application No. PCT/CN2019/081848 filed on Apr. 9, 2019, which claims priority to Chinese application No. 201810848244.3 filed Jul. 27, 2018 and Chinese application No. 201810866001.2 filed Aug. 1, 2018, the entire contents of all of which are hereby incorporated by reference.

TECHNICAL FIELD

Implementations of the present disclosure relate to the technical field of mobile communication, in particular to a transmission resource determining method and apparatus, and a terminal device.

BACKGROUND

In order to support flexibility of a terminal device using different bandwidths for transmission under a large system bandwidth of New Radio (NR), the NR introduces a concept of Band Width Part (BWP). The introduction of the BWP is beneficial to power saving of the terminal device. Based on an existing standard of the NR, a network may configure up to 4 BWPs for a terminal device. Thereby, among multiple BWP configurations, a BWP with a large bandwidth may be included, and a BWP with a small bandwidth may be included. When a service load of the terminal device is heavier, the terminal device switches to the BWP with the large bandwidth to send and receive data; when the service load of the terminal device is lighter, the terminal device switches to the BWP with the small bandwidth to send and receive data, thus reducing power consumption of the terminal device.

However, based on the current BWP operation mechanism, when the terminal device is configured to work in a BWP with a larger bandwidth, even if the terminal device is not scheduled, the terminal device also needs to receive a bandwidth of an entire BWP, because a base station may initiate data scheduling for the terminal device at any time, and if the terminal device does not receive the bandwidth of the entire BWP, a data signal may be missed.

SUMMARY

Implementations of the present disclosure provide a method and apparatus for determining a transmission resource, and a terminal device.

A method for determining a transmission resource provided by an implementation of the present disclosure includes: determining, by a terminal device, a first receiving bandwidth corresponding to a downlink signal based on a bandwidth of a first control resource set or a bandwidth of a first indication signal, wherein the first control resource set is used for transmitting a downlink control channel, and the first indication signal is used for the terminal device to determine whether to monitor the downlink control channel at a downlink control channel monitoring moment.

An apparatus for determining a transmission resource provided by an implementation of the present disclosure includes: a first determining unit, configured to determine a first receiving bandwidth corresponding to a downlink signal based on a bandwidth of a first control resource set or a bandwidth of a first indication signal, wherein the first control resource set is used for transmitting a downlink control channel, and the first indication signal is used for the terminal device to determine whether to monitor the downlink control channel at a downlink control channel monitoring moment.

A method for determining a transmission resource provided by an implementation of the present disclosure includes: determining, by a terminal device, whether to receive a second carrier based on a first downlink control channel or a first indication signal on a first carrier, wherein the first downlink control channel is capable of scheduling a data channel on the second carrier, the first indication signal is used for indicating whether the terminal device monitors a second downlink control channel, and the second downlink control channel is used for scheduling the data channel on the second carrier.

An apparatus for determining a transmission resource provided by an implementation of the present disclosure includes: a first determining unit, configured to determine whether to receive a second carrier based on a first downlink control channel or a first indication signal on a first carrier, wherein the first downlink control channel is capable of scheduling a data channel on the second carrier, the first indication signal is used for indicating whether the terminal device monitors a second downlink control channel, and the second downlink control channel is used for scheduling the data channel on the second carrier.

A terminal device provided by an implementation of the present disclosure includes a processor and a memory. The memory is configured to store a computer program, and the processor is configured to call and run the computer program stored in the memory to execute the method for determining a transmission resource described above.

A chip provided by an implementation of the present disclosure is configured to implement the method for determining a transmission resource described above.

Specifically, the chip includes a processor, configured to call and run a computer program from a memory, so that a device installed with the chip performs the method for determining a transmission resource described above.

A computer readable storage medium provided by an implementation of the present disclosure is configured to store a computer program, wherein the computer program causes a computer to perform the method for determining a transmission resource described above.

A computer program product provided by an implementation of the present disclosure includes computer program instructions, wherein the computer program instructions cause a computer to perform the method for determining a transmission resource described above.

A computer program provided by an implementation of the present disclosure, when running on a computer, causes the computer to perform the method for determining a transmission resource described above.

Through the above technical solution, a terminal device may determine a first receiving bandwidth corresponding to a downlink signal based on a bandwidth of a first control resource set or a bandwidth of a first indication signal, and since the bandwidth of the first control resource set or the bandwidth of the first indication signal is smaller than a bandwidth of a BWP currently activated for the terminal device, saving of power consumption may be achieved.

BRIEF DESCRIPTION OF DRAWINGS

FIG. 1 is a schematic diagram of an architecture of a communication system provided by an implementation of the present disclosure.

FIG. 2 is a first schematic diagram of a flow of a method for determining a transmission resource provided by an implementation of the present disclosure.

FIG. 3 is a schematic diagram of PDCCH monitoring based on a CORESET BWP provided by an implementation of the present disclosure.

FIG. 8 is a second schematic diagram of a flow of a method for determining a transmission resource provided by an implementation of the present disclosure.

FIG. 9 is a second schematic diagram of structure of an apparatus for determining a transmission resource provided by an implementation of the present disclosure.

FIG. 10 is a schematic structural diagram of a communication device provided by an implementation of the present disclosure.

DETAILED DESCRIPTION

Figure 4:
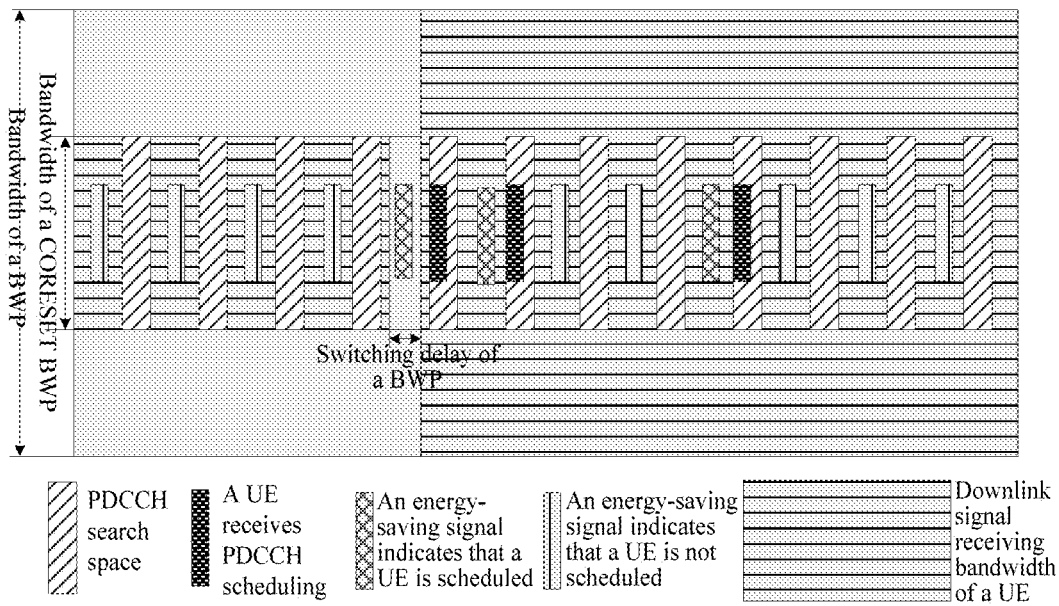
FIG. 4 is a schematic diagram of signal reception based on a power-saving signal BWP provided by an implementation of the present disclosure.

The technical solution in implementations of the present disclosure will be described below with reference to the drawings in implementations of the present disclosure. It is apparent that the implementations described are just some implementations of the present disclosure, but not all implementations of the present disclosure. According to the implementations of the present disclosure, all other implementations achieved by a person of ordinary skill in the art without paying inventive efforts are within the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, or a 5G system.

Illustratively, a communication system 100 applied in an implementation of the present disclosure is shown in FIG. 1. The communication system 100 may include a network device 110, wherein the network device 110 may be a device that communicates with a terminal device 120 (or referred to as a communication terminal device, or a terminal device). The network device 110 may provide communication coverage for a specific geographical area, and may communicate with terminal devices located within the coverage area. Optionally, the network device 110 may be a Base Transceiver Station (BTS) in a GSM system or a CDMA system, or a NodeB (NB) in a WCDMA system, or an Evolutional Node B (eNB or eNodeB) in an LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a 5G network, or a network device in a future evolved Public Land Mobile Network (PLMN), etc.

The communication system 100 also includes at least one terminal device 120 located within a coverage range of the network device 110. As used herein, the term "terminal device" includes, but not limited to, an apparatus configured to receive/send communication signals via a wired line connection, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, and an AM-FM broadcast transmitter; and/or via another terminal device; and/or an Internet of Things (IoT) device. A terminal device configured to communicate via a wireless interface may be referred to as a "wireless communication terminal device", a "wireless terminal device" or a "mobile terminal device". Examples of the mobile terminal device include, but not limited to, a satellite or cellular telephone, a Personal Communication System (PCS) terminal device which may be combined with a cellular wireless telephone and data processing, faxing, and data communication capability, a PDA that may include a radio telephone, a pager, an internet/intranet access, a Web browser, a notepad, a calendar, and/or a Global Positioning System (GPS) receiver, and a conventional laptop and/or handheld receiver or another electronic apparatus including a radio telephone transceiver. The terminal device may be referred to as an access terminal device, a User Equipment (UE), a subscriber unit, a subscriber station, a mobile station, a mobile platform, a remote station, a remote terminal device, a mobile device, a user terminal device, a terminal device, a wireless communication device, a user agent or a user apparatus. The access terminal device may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN, or the like.

Optionally, Device to Device (D2D) communication of terminal devices may be performed between the terminal devices 120.

Optionally, the 5G system or the 5G network may be referred to as a New Radio (NR) system or an NR network.

FIG. 1 exemplifies one network device and two terminal devices. Optionally, the communication system 100 may include multiple network devices, and another quantity of terminal devices may be included within a coverage range of each network device, which is not limited by implementation of the present disclosure.

Optionally, the communication system 100 may include other network entities such as a network controller, and a mobile management entity, which are not limited in the implementations of the present disclosure.

It should be understood that, a device with a communication function in a network/system in the implementation of the present disclosure may be referred to as a communication device. Taking the communication system 100 shown in FIG. 1 as an example, the communication device may include a network device 110 and a terminal device 120 which have communication functions, and the network device 110 and the terminal device 120 may be the specific devices described above, which will not be repeated here. The communication device may also include other devices in the communication system 100, such as other network entities such as a network controller, a mobile management entity, etc., which are not limited by the implementation of the present disclosure.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

In order to facilitate understanding of the technical solutions of the implementations of the present disclosure, related technologies of the implementations of the present disclosure will be explained below.

In NR, PDCCH control resource set is PDCCH CORESET for short, an NR UE monitors PDCCH within a PDCCH search space, and the PDCCH CORESET provides a time-frequency resource location of the PDCCH search space. Following is configuration information of the PDCCH CORESET:
- a control resource set index p, $0 \leq p < 12$, which is provided by a higher layer signaling parameter controlResourceSetId;
- an initial value of a DMRS scrambling sequence, which is provided by higher layer signaling pdcch-DMRS-ScramblingID;
- a precoder granularity in a frequency domain, which is provided by a higher layer parameter precoderGranularity;
- an occupied time domain symbol;
- a quantity of PRBs in the frequency domain;
- a CCE-to-REG mapping parameter;
- an antenna port quasi co-location information, from a set of antenna port quasi co-locations;
- information indicating whether a transmission configuration indication (TCI) field for DCI format 1_1 presents.

FIG. 2 is a first schematic diagram of a flow of a method for determining a transmission resource provided by an implementation of the present disclosure. As shown in FIG. 2, the method for determining a transmission resource includes a following act.

In act 201, a terminal device determines a first receiving bandwidth corresponding to a downlink signal based on a bandwidth of a first control resource set or a bandwidth of a first indication signal, wherein the first control resource set is used for transmitting a downlink control channel, and the first indication signal is used for the terminal device to determine whether to monitor the downlink control channel at a downlink control channel monitoring moment.

In the implementation of the present disclosure, the terminal device may be any device that can communicate with the network device, such as a mobile phone, a tablet computer, a vehicle-mounted terminal device, etc.

In the implementation of the present disclosure, description of a search space may be denoted as a PDCCH search space, and description of a PDCCH search space may be understood as a search space.

In the implementation of the present disclosure, description of the first control resource set may be denoted as PDCCH CORESET, and description of PDCCH CORESET may be understood as the first control resource set. The first control resource set is used for transmitting the downlink control channel.

In the implementation of the present disclosure, the first indication signal is used for the terminal device to determine whether to monitor the downlink control channel at the downlink control channel monitoring moment. The first indication signal has an association relationship with at least one downlink control channel monitoring moment, wherein the association relationship between the first indication signal and the at least one downlink control channel monitoring moment appears periodically in time.

In the implementation of the present disclosure, the terminal device determines the first receiving bandwidth corresponding to the downlink signal based on the bandwidth of the first control resource set or the bandwidth of the first indication signal. Here, the bandwidth of the first control resource set may also be referred to as a CORESET BWP, and the bandwidth of the first indication signal may also be referred to as a power-saving signal BWP. Compared with the configured BWP of the terminal device, the CORESET BWP or the power-saving signal BWP is smaller than the configured BWP of the terminal device, so that the terminal device receives the downlink signal on the first receiving bandwidth, which may save power consumption of the terminal device.

In the implementation of the present disclosure, the terminal device may determine the first receiving bandwidth corresponding to the downlink signal based on the bandwidth of the first control resource set, or may determine the first receiving bandwidth corresponding to the downlink signal based on the bandwidth of the first indication signal, which are described below respectively.

1) The terminal device determines the first receiving bandwidth corresponding to the downlink signal based on the bandwidth of the first control resource set.

Before the terminal device detects a first downlink control channel for the terminal device, the terminal device determines the first receiving bandwidth corresponding to the downlink signal based on the bandwidth of the first control resource set.

Here, the first receiving bandwidth needs to cover the bandwidth of the first control resource set, that is, the first receiving bandwidth is greater than or equal to the bandwidth of the first control resource set. For example, the bandwidth of the first control resource set is B1, and the first receiving bandwidth is B2, and B2≥B1.

After the terminal device detects the first downlink control channel for the terminal device, the terminal device determines a second receiving bandwidth corresponding to the downlink signal based on a bandwidth of a Band Width Part (BWP) currently in an active state.

Here, after the terminal device detects the first downlink control channel for the terminal device, the receiving bandwidth corresponding to the downlink signal is switched from the first receiving bandwidth to the second receiving bandwidth, the switching from the first receiving bandwidth to the second receiving bandwidth of the terminal device corresponds to a first switching duration, and a time interval between the first downlink control channel detected by the terminal device based on the first receiving bandwidth and a first downlink data channel scheduled by the first downlink control channel is greater than or equal to the first switching duration.

2) The terminal device determines the first receiving bandwidth corresponding to the downlink signal based on the bandwidth of the first indication signal.

Before the terminal device detects the first indication signal used for indicating that the downlink control channel is monitored at the downlink control channel monitoring moment, the terminal device determines the first receiving bandwidth corresponding to the downlink signal based on the bandwidth of the first indication signal.

Here, the first receiving bandwidth needs to cover the bandwidth of the first indication signal, that is, the first receiving bandwidth is greater than or equal to the bandwidth of the first indication signal. For example, the bandwidth of the first indication signal is B3, and the first receiving bandwidth is B2, wherein B2≥B3.

After the terminal device detects the first indication signal used for indicating that the downlink control channel is monitored at the downlink control channel monitoring moment, the terminal device determines the second receiving bandwidth corresponding to the downlink signal based on the bandwidth of the BWP currently in the active state.

Here, 1) after the terminal device detects the first indication signal used for indicating that the downlink control channel is monitored at the downlink control channel monitoring moment, the receiving bandwidth corresponding to the downlink signal is switched from the first receiving bandwidth to the second receiving bandwidth, wherein the switching from the first receiving bandwidth to the second receiving bandwidth of the terminal device corresponds to a second switching duration, and a time interval between the first indication signal detected by the terminal device based on the first receiving bandwidth and the downlink control channel monitoring moment associated with the first indication signal is greater than or equal to the second switching duration. Or, 2) after the terminal device detects the first indication signal used for indicating that the downlink control channel is monitored at the downlink control channel monitoring moment, the terminal device determines a third receiving bandwidth corresponding to the downlink signal based on the bandwidth of the first control resource set; after the terminal device detects the first downlink control channel for the terminal device on the third receiving bandwidth, the terminal device determines the second receiving bandwidth corresponding to the downlink signal based on the bandwidth of the BWP currently in the active state. Herein, after the terminal device detects the first indication signal used for indicating that the downlink control channel is monitored at the downlink control channel monitoring moment, the receiving bandwidth corresponding to the downlink signal is switched from the first receiving bandwidth to the third receiving bandwidth, and after the terminal device detects the first downlink control channel for the terminal device on the third receiving bandwidth, the receiving bandwidth corresponding to the downlink signal is switched from the third receiving bandwidth to the second receiving bandwidth, wherein the switching from the first receiving bandwidth to the third receiving bandwidth of the terminal device corresponds to a third switching duration, the switching from the third receiving bandwidth to the second receiving bandwidth of the terminal device corresponds to a fourth switching duration, a time interval between the first indication signal detected by the terminal device based on the first receiving bandwidth and the downlink control channel monitoring moment associated with the first indication signal is greater than or equal to the third switching duration, and a time interval between the first downlink control channel detected by the terminal device based on the third receiving bandwidth and the first downlink data channel scheduled by the first downlink control channel is greater than or equal to the fourth switching duration.

In an implementation, the first indication signal has an association relationship with at least one downlink control channel monitoring moment, wherein the association relationship between the first indication signal and the at least one downlink control channel monitoring moment appears periodically in time.

In an implementation, if multiple configured search spaces of the terminal device have overlapping parts in time or time intervals among the multiple configured search spaces in time are less than or equal to a first threshold value, the terminal device determines the first receiving bandwidth of the downlink signal based on first bandwidths of the first control resource sets corresponding to the multiple search spaces respectively.

Here, the terminal device determines that the first receiving bandwidth of the downlink signal covers the first bandwidths of the first control resource sets corresponding to all the multiple search spaces respectively. Further, within a time range in which the multiple search spaces overlap in time, the first receiving bandwidth of the downlink signal covers the first bandwidths of the first control resource sets corresponding to all the multiple search spaces respectively; or, within a time range in which the time intervals among the multiple search spaces in time are less than or equal to a first threshold value, the first receiving bandwidth of the downlink signal covers the first bandwidths of the first control resource sets corresponding to all the multiple search spaces respectively.

For example, SS1 (Search Space 1) and SS2 (Search Space 2) have an overlapping region in time (they may overlap completely or partially), and a time range of the overlapping of the SS1 and the SS2 in time is [t1, t2], then, within a time domain range from t1 to t2, the first receiving bandwidth of the downlink signal covers the first bandwidth of the first control resource set corresponding to the SS1 and the first bandwidth of the first control resource set corresponding to the SS2.

For example, a time interval between the SS1 and the SS2 in time is t, and t is less than the first threshold value, then within a time domain range from the SS1 to the SS2, the first receiving bandwidth of the downlink signal covers the first bandwidth of the first control resource set corresponding to the SS1 and the first bandwidth of the first control resource set corresponding to the SS2. Thereby a case that data cannot be normally received due to a bandwidth switching delay is avoided.

According to the technical solution of the implementation of the present disclosure, a terminal device may receive a downlink signal with a narrower receiving bandwidth (a PDCCH CORESET bandwidth or a receiving bandwidth of a power-saving signal) at a PDCCH monitoring moment when Physical Downlink Control Channel (PDCCH) scheduling is not received or the time when a power-saving signal which indicates that a UE has data to be scheduled is not received and, so as to achieve power consumption saving.

In addition, the technical solution of the implementation of the present disclosure further includes: determining based on a first timer that the receiving bandwidth corresponding to the downlink signal is the first receiving bandwidth or the second receiving bandwidth, wherein the second receiving bandwidth is determined based on a bandwidth of a BWP currently in an active state. Specifically, corresponding to the above case that the first receiving bandwidth corresponding to the downlink signal is determined based on the bandwidth of the first control resource set, the terminal device starts the first timer, and restarts the first timer if the terminal device detects a downlink control channel at any downlink control channel monitoring moment; if the terminal device does not detect the downlink control channel, the first timer keeps timing; if the first timer expires, the terminal device switches the receiving bandwidth corresponding to the downlink signal from the second receiving bandwidth to the first receiving bandwidth. Taking the timing of the first timer being a downlink control channel monitoring period as an example, if the terminal device does not detect a downlink control channel at one downlink control channel monitoring moment, a count of the first timer is increased. Corresponding to the above case that the first receiving bandwidth corresponding to the downlink signal is determined based on the bandwidth of the first indication signal, the terminal device starts the first timer, and restarts the first timer if the terminal device detects, at any first indication signal monitoring moment, the first indication signal for indicating that the downlink control channel is monitored at the downlink control channel monitoring moment; if the terminal device does not detect the first indication signal for indicating that the downlink control channel is monitored at the downlink control channel monitoring moment, the first timer keeps timing; if the first timer expires, the terminal device switches the receiving bandwidth corresponding to the downlink signal to the first receiving bandwidth. Taking the timing of the first timer being the first indication signal monitoring period as an example, if the terminal device does not detect, at one first indication signal monitoring moment, the first indication signal for indicating that the downlink control channel is monitored at the downlink control channel monitoring moment, a count of the first timer is increased.

In the above solution, first duration information of the first timer is configured by a network device; or, first duration information of the first timer is preconfigured. Here, a value of the first duration information may be a duration, or a quantity of sub-frames, or time slots, or PDCCH search space periods. Accordingly, the timing of the first timer may be counting of time, or counting of sub-frames, or time slots, or PDCCH search space periods.

In an implementation, after switching the receiving bandwidth corresponding to the downlink signal from the first receiving bandwidth to the second receiving bandwidth, the terminal device determines based on the first timer that the receiving bandwidth corresponding to the downlink signal is the first receiving bandwidth or the second receiving bandwidth.

The technical solution of the implementation of the present disclosure, in combination with a timer-based control mode, ensures that a terminal device receives, when there is data scheduling, a downlink signal based on a large receiving bandwidth, and falls, when there is no data scheduling, back to the aforementioned narrower receiving bandwidth to receive a downlink signal.

The technical solution of the implementation of the present disclosure will be illustrated below with reference to specific disclosure examples.

DISCLOSURE EXAMPLE ONE

When the terminal device works in a BWP with a larger bandwidth, a bandwidth of PDCCH CORESET to be monitored configured by the network for the terminal device may be smaller or far smaller than the bandwidth of the BWP. However, based on a current standard, the terminal device is required to receive a bandwidth of the entire BWP. Otherwise, if a UE receives a signal with a receiving bandwidth smaller than the BWP, PDSCH data scheduled by a base station may be missed. But in essence, the terminal device may not always be scheduled within the BWP at all time. On the contrary, there may be most of the time when the terminal device is not scheduled. In this case, the terminal device may receive one small bandwidth when there is no data to be scheduled, this small bandwidth needs to be greater than or equal to the bandwidth of the PDCCH CORSET, and the terminal device may receive data with the bandwidth of the really entire BWP when there is data to be scheduled, which is beneficial to power consumption saving of the terminal device. In view of this, one PDCCH CORESET BWP may be defined, wherein a size of the BWP is equal to the bandwidth of the PDCCH CORESET, and a frequency location of the BWP is also the same as that of the PDCCH CORESET, as shown in FIG. 3. The terminal device usually only receives the PDCCH CORESET BWP, and receives the bandwidth of the entire BWP when detecting that the PDCCH CORESET has a scheduled PDCCH for the terminal device. However, this kind of operation has some restriction on a scheduling behavior of the base station, that is, when the terminal device receives PDCCH scheduling for the first time, timing between the PDSCH scheduled by the PDCCH and the PDCCH should be greater than a certain time threshold, so that the terminal device may switch to a normal BWP bandwidth within the time threshold. It is specified on a current protocol that, when the n-th slot detects PDCCH DCI, the slot of the PDSCH is:

$$\left\lfloor n \cdot \frac{2^{\mu PDSCH}}{2^{\mu PDCCH}} \right\rfloor + K_0$$

Herein, K0 is a slot offset between the PDCCH and the PDSCH configured by higher layer signaling, and may have values of 0, 1, 2, and 3. It may be seen from the above formula that the protocol may support a larger timeoffset, so the protocol has a foundation to support the above operation.

Similarly, when PDCCH monitoring with a power-saving signal wake-up mechanism is adopted, a downlink receiving bandwidth of the terminal device may be determined based on a bandwidth of a power-saving signal, wherein the determined downlink receiving bandwidth is greater than or equal to the bandwidth of the power-saving signal. Therefore, a power-saving signal BWP may be defined by combining the bandwidth and the frequency location of the power-saving signal. As shown in FIG. 4, a size of the power-saving signal BWP is greater than or equal to the bandwidth of the power-saving signal, and a frequency location of the BWP is the same as that of the power-saving signal. Usually the terminal device only monitors the power-saving signal within the power-saving signal BWP. When the network has data scheduling, the network sends a power-saving signal to the terminal device, and after receiving the power-saving signal, the terminal device expands a receiving bandwidth to an entire normal BWP bandwidth. Referring to FIG. 4, the terminal device monitors the power-saving signal within the power-saving signal BWP (the power-saving signal BWP is smaller than a normal BWP and greater than or equal to the bandwidth of the power-saving signal). Here, the terminal device monitors the power-saving signal at every power-saving signal monitoring moment. The detected power-saving signal may indicate whether the UE is scheduled or not, that is, the detected power-saving signal may indicate whether at least one PDCCH associated with the power-saving signal (FIG. 4 shows that one power-saving signal is associated with one PDCCH) is scheduled or not. When the terminal device receives the power-saving signal and the power-saving signal is used for indicating that the UE is scheduled, the receiving bandwidth is extended to the entire normal BWP bandwidth, and then the terminal device monitors PDCCH scheduling within this normal BWP bandwidth.

It should be noted that when the terminal device is not scheduled, the terminal device may determine, based on the bandwidth of the PDCCH CORSET or the bandwidth of the power-saving signal, that the downlink receiving bandwidth is not less than the bandwidth of the PDCCH CORSET or the bandwidth of the power-saving signal mentioned above. However, if the terminal device has a requirement of receiving another signal, such as a configuration or synchronization requirement based on a Channel State Information (CSI) measurement, a Radio Resource Measurement (RRM), and a Radio Link Monitoring (RLM) measurement. When the terminal device performs the above operation, the terminal device may determine the downlink receiving bandwidth based on a bandwidth satisfying the above operation requirement (the downlink receiving bandwidth needs to be greater than or equal to the bandwidth satisfying the above operation requirement). For example, when the CSI measurement is configured, when the CSI measurement needs to be performed, the downlink receiving bandwidth is determined based on a bandwidth of the CSI measurement. After the above operation is finished and the terminal device is still not scheduled, the terminal device may determine that the downlink receiving bandwidth is not less than the bandwidth of the PDCCH CORSET or the bandwidth of the power-saving signal mentioned above based on the bandwidth of the PDCCH CORSET or the bandwidth of the power-saving signal again.

DISCLOSURE EXAMPLE TWO

Figure 5:
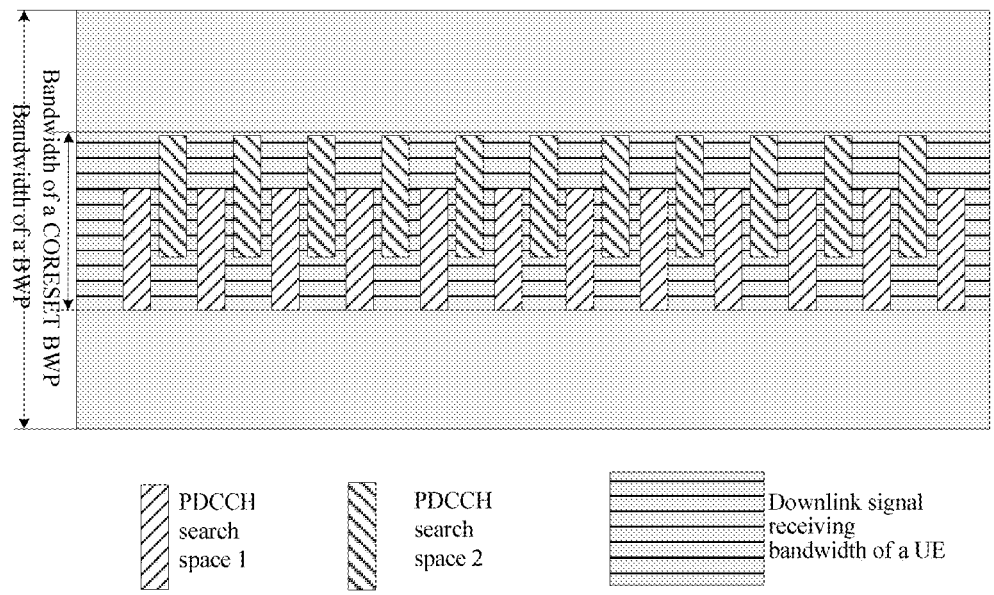
FIG. 5 is a first schematic diagram of a downlink receiving bandwidth provided by an implementation of the present disclosure.

A downlink receiving bandwidth always contains bandwidths of PDCCH CORESETs corresponding to multiple PDCCH search spaces, and the downlink receiving bandwidth may be referred to as a PDCCH CORESET BWP. With reference to FIG. 5, the PDCCH CORESET BWP (i.e., the downlink signal receiving bandwidth) covers a bandwidth of a PDCCH CORESET corresponding to a PDCCH search space1 and a bandwidth of a PDCCH CORESET corresponding to a PDCCH search space2.

Figure 6:
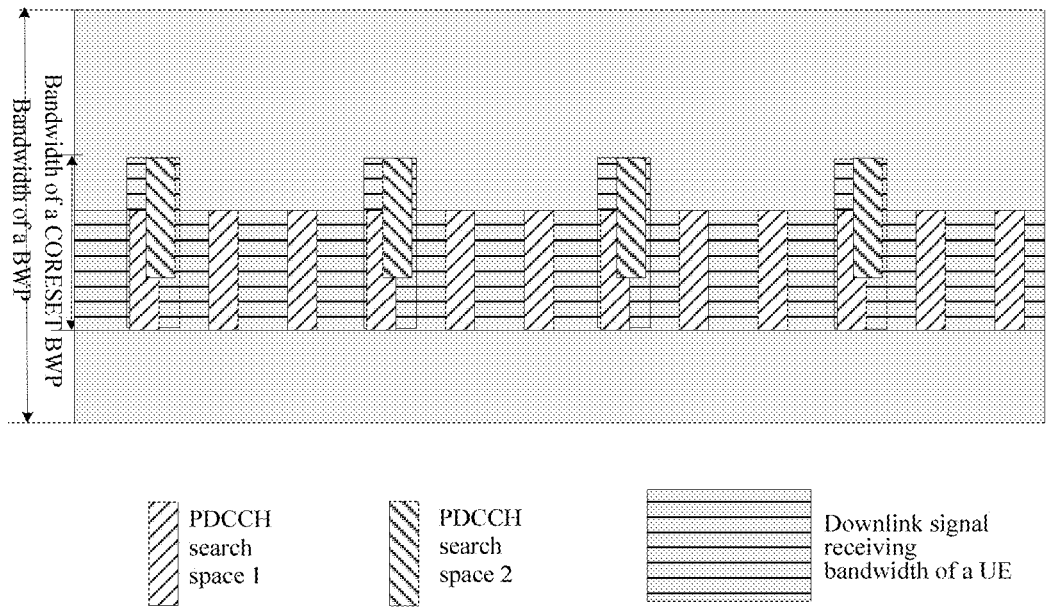
FIG. 6 is a second schematic diagram of a downlink receiving bandwidth provided by an implementation of the present disclosure.

Further, for a downlink receiving bandwidth, when multiple PDCCH CORESETs corresponding to multiple PDCCH search spaces overlap or partially overlap in time or time intervals among the multiple PDCCH CORESETs are not greater than a first threshold T, the downlink receiving bandwidth contains, at the receiving moments of the above PDCCH CORESETs with overlapping time or similar time, the bandwidths of all the PDCCH CORESETs with overlapping time or similar time. With reference to FIG. 6, the PDCCH search space1 and the PDCCH search space2 have an overlapping part in time (FIG. 6 shows partially overlapping, but it is not limited to this, and may be all overlapping). For this part of the PDCCH search space1 and PDCCH search space2, the PDCCH CORESET BWP (i.e., the downlink signal receiving bandwidth) covers the bandwidth of the PDCCH CORESET corresponding to the PDCCH search space1 and the bandwidth of the PDCCH CORESET corresponding to the PDCCH search space2. For a time domain range where only PDCCH search space1 presents in time, the PDCCH CORESET BWP (i.e., the downlink signal receiving bandwidth) only needs to cover the bandwidth of the PDCCH CORESET corresponding to the PDCCH search space 1. Similarly, for a time domain range where only PDCCH search space2 presents in time, the PDCCH CORESET BWP (i.e., the downlink signal receiving bandwidth) only needs to cover the bandwidth of the PDCCH CORESET corresponding to the PDCCH search space 2.

It should be noted that when the network device configures multiple PDCCH search spaces to the terminal, wherein each search space corresponds to one PDCCH CORESET; the terminal may determine the downlink receiving bandwidth based on the bandwidths of these PDCCH CORESETs by the above approach; however, based on some requirements of the network, not all PDCCH CORESETs corresponding to the PDCCH search spaces may participate in the above determination of the downlink receiving bandwidth. For example, for one PDCCH CORESET therein, the terminal determines the downlink receiving bandwidth by a bandwidth of a currently activated BWP when receiving the PDCCH CORESET, instead of determining the downlink receiving bandwidth by the bandwidth of the PDCCH CORESET.

FIG. 6 shows a case where multiple PDCCH search spaces overlap or partially overlap in time. For a case that time intervals among multiple PDCCH search spaces are not greater than the first threshold T, similarly, for example, the time interval between the PDCCH search space1 and the PDCCH search space2 is not greater than T, for this part of the PDCCH search space1 and PDCCH search space2, the PDCCH CORESET BWP (i.e., the downlink signal receiving bandwidth) needs to cover the bandwidth of the PDCCH CORESET corresponding to the PDCCH search space1 and the bandwidth of the PDCCH CORESET corresponding to the PDCCH search space2.

DISCLOSURE EXAMPLE THREE

For a case that the downlink receiving bandwidth is determined based on the first indication signal, the bandwidth may be switched in following two modes.

In mode 1, for a case that a UE receives a downlink signal within an power-saving signal BWP, if the UE detects a power-saving signal scheduling the UE, the UE switches the bandwidth to a PDCCH CORESET BWP, and receives a downlink signal within the PDCCH CORESET BWP; if the UE further detects PDCCH scheduling, the UE then switches the bandwidth to a normal BWP.

In mode 2, for a case that the UE receives a downlink signal within an power-saving signal BWP, if the UE detects a power-saving signal scheduling the UE, the UE directly switches the bandwidth to a normal BWP.

DISCLOSURE EXAMPLE FOUR

In order to avoid frequently switching, by the terminal device, receiving bandwidths with different sizes, the terminal device switches to a receiving bandwidth of a currently activated BWP after receiving scheduling or receiving a power-saving signal indication, and the terminal device needs to maintain the receiving bandwidth of the BWP for a period of time. As a fallback mechanism of the above based on a PDCCH CORESET BWP mechanism or a power-saving signal BWP mechanism, if the terminal device receives a scheduling and extends to a normal BWP, and doesn't receive a scheduling for a period of time after completely receiving PDSCH scheduling, the terminal device may fall back to the receiving bandwidth of the above PDCCH CORESET or the receiving bandwidth of the power-saving signal to save power consumption.

The above requirement may be implemented based on control of the first timer (hereinafter referred to as the first timer), for example, the timer will be started after the PDCCH is received, and the terminal device falls back to the above PDCCH CORESET BWP only after new PDCCH scheduling is not received for a period of time and the timer expires. Or, the terminal device may fall back based on a network-side command, such as an PDCCH order. Specifically, every time the terminal device detects the PDCCH for the terminal device, the terminal device restarts the first timer; the terminal device does not detect the PDCCH for the terminal device in the corresponding PDCCH search space, then a count of the first timer is increased; when the first timer expires, the terminal device switches to the downlink receiving bandwidth determined based on the bandwidth of the PDCCH CORESET.

For another example, the timer is started after the power-saving signal indication is received, and only after a new power-saving signal is not received for a period of time and the timer expires, the terminal device falls back to the above power-saving signal BWP. Or, the terminal device may fall back based on a network-side command, such as an PDCCH order. Specifically, every time the terminal device detects the power-saving signal scheduling the UE, the terminal device restarts the first timer; if the terminal device does not detect the power-saving signal scheduling the UE at the monitoring moment of the corresponding power-saving signal, then a count of the first timer is increased; when the first timer expires, the terminal device switches to the downlink receiving bandwidth determined based on the bandwidth of the power-saving signal.

Figure 7:
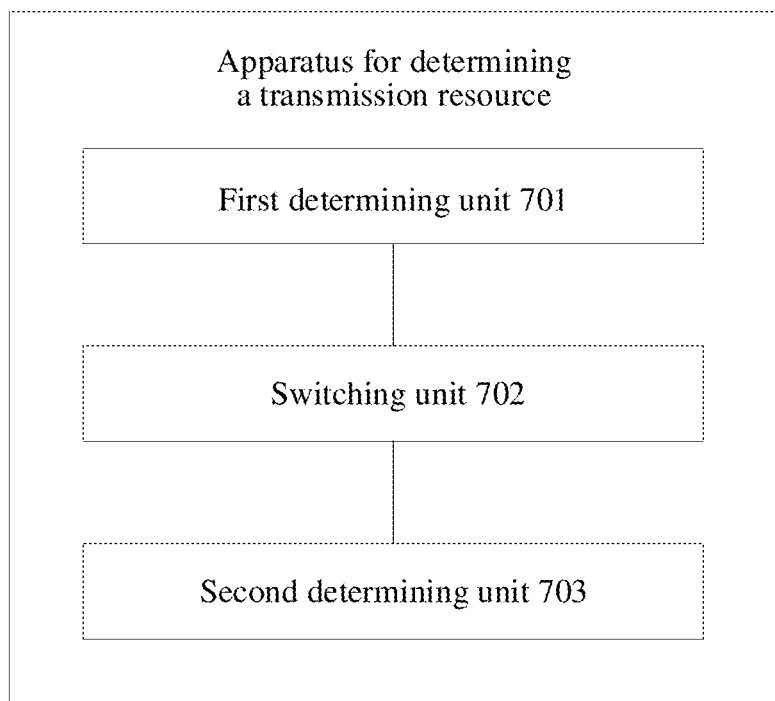
FIG. 7 is a first schematic diagram of structure of an apparatus for determining a transmission resource provided by an implementation of the present disclosure.

FIG. 7 is a first schematic diagram of structure of an apparatus for determining a transmission resource provided by an implementation of the present disclosure. As shown in FIG. 7, the apparatus includes: a first determining unit 701, configured to determine a first receiving bandwidth corresponding to a downlink signal based on a bandwidth of a first control resource set or a bandwidth of a first indication signal, wherein the first control resource set is used for transmitting a downlink control channel, and the first indication signal is used for the terminal device to determine whether to monitor the downlink control channel at a downlink control channel monitoring moment.

In an implementation, before the terminal device detects a first downlink control channel for the terminal device, the first determining unit 701 determines the first receiving bandwidth corresponding to the downlink signal based on the bandwidth of the first control resource set.

In an implementation, after the terminal device detects the first downlink control channel for the terminal device, the first determining unit 701 determines a second receiving bandwidth corresponding to the downlink signal based on a bandwidth of a Band Width Part (BWP) currently in an active state.

In an implementation, the apparatus further includes: a switching unit 702; after the terminal device detects the first downlink control channel for the terminal device, the switching unit switches the receiving bandwidth corresponding to the downlink signal from the first receiving bandwidth to the second receiving bandwidth, wherein the switching from the first receiving bandwidth to the second receiving bandwidth of the terminal device corresponds to a first switching duration, and a time interval between the first downlink control channel detected by the terminal device based on the first receiving bandwidth and a first downlink data channel scheduled by the first downlink control channel is greater than or equal to the first switching duration.

In an implementation, before the terminal device detects the first indication signal used for indicating that the downlink control channel is monitored at the downlink control channel monitoring moment, the first determining unit 701 determines the first receiving bandwidth corresponding to the downlink signal based on the bandwidth of the first indication signal.

In an implementation, after the terminal device detects the first indication signal used for indicating that the downlink control channel is monitored at the downlink control channel monitoring moment, the first determining unit 701 determines a second receiving bandwidth corresponding to the downlink signal based on the bandwidth of the BWP currently in the active state; or, after the terminal device detects the first indication signal used for indicating that the downlink control channel is monitored at the downlink control channel monitoring moment, the first determining unit 701 determines a third receiving bandwidth corresponding to the downlink signal based on the bandwidth of the first control resource set; after the terminal device detects the first downlink control channel for the terminal device on the third receiving bandwidth, the first determining unit 701 determines the second receiving bandwidth corresponding to the downlink signal based on the bandwidth of the BWP currently in the active state.

In an implementation, the apparatus further includes: a switching unit 702; after the terminal device detects the first indication signal used for indicating that the downlink control channel is monitored at the downlink control channel monitoring moment, the switching unit switches the receiving bandwidth corresponding to the downlink signal from the first receiving bandwidth to the second receiving bandwidth, wherein the switching from the first receiving bandwidth to the second receiving bandwidth of the terminal device corresponds to a second switching duration, and a time interval between the first indication signal detected by the terminal device based on the first receiving bandwidth and the downlink control channel monitoring moment associated with the first indication signal is greater than or equal to the second switching duration.

Or, after the terminal device detects the first indication signal used for indicating that the downlink control channel is monitored at the downlink control channel monitoring moment, the switching unit 702 switches the receiving bandwidth corresponding to the downlink signal from the first receiving bandwidth to the third receiving bandwidth, and after the terminal device detects the first downlink control channel for the terminal device on the third receiving bandwidth, the switching unit switches the receiving bandwidth corresponding to the downlink signal from the third receiving bandwidth to the second receiving bandwidth, wherein the switching from the first receiving bandwidth to the third receiving bandwidth of the terminal device corresponds to a third switching duration, the switching from the third receiving bandwidth to the second receiving bandwidth of the terminal device corresponds to a fourth switching duration, a time interval between the first indication signal detected by the terminal device based on the first receiving bandwidth and the downlink control channel monitoring moment associated with the first indication signal is greater than or equal to the third switching duration, and a time interval between the first downlink control channel detected by the terminal device based on the third receiving bandwidth and the first downlink data channel scheduled by the first downlink control channel is greater than or equal to the fourth switching duration.

In an implementation, the first indication signal has an association relationship with at least one downlink control channel monitoring moment, wherein the association relationship between the first indication signal and the at least one downlink control channel monitoring moment appears periodically in time.

In an implementation, if multiple configured search spaces of the terminal device have overlapping parts in time or time intervals among the multiple configured search spaces in time are less than or equal to a first threshold value, the first determining unit 701 determines the first receiving bandwidth of the downlink signal based on first bandwidths of the first control resource sets corresponding to the multiple search spaces respectively.

In an implementation, the first determining unit 701 determines that the first receiving bandwidth of the downlink signal covers first bandwidths of the first control resource sets corresponding to all the multiple search spaces respectively.

In an implementation, within a time range in which the multiple search spaces overlap in time, the first receiving bandwidth of the downlink signal covers first bandwidths of the first control resource sets corresponding to all the multiple search spaces respectively; or, within a time range in which the time intervals among the multiple search spaces in time are less than or equal to the first threshold value, the first receiving bandwidth of the downlink signal covers first bandwidths of the first control resource sets corresponding to all the multiple search spaces respectively.

In an implementation, the apparatus further includes: a second determining unit 703, configured to determine based on a first timer that the receiving bandwidth corresponding to the downlink signal is the first receiving bandwidth or the second receiving bandwidth, wherein the second receiving bandwidth is determined based on a bandwidth of a BWP currently in an active state.

In an implementation, the second determining unit 703 is configured to start the first timer, and restart the first timer if the terminal device detects a downlink control channel at any downlink control channel monitoring moment; if the terminal device does not detect the downlink control channel, the first timer keeps timing; if the first timer expires, the terminal device switches the receiving bandwidth corresponding to the downlink signal from the second receiving bandwidth to the first receiving bandwidth.

In an implementation, if the terminal device does not detect a downlink control channel at one downlink control channel monitoring moment, a count of the first timer is increased.

In an implementation, the second determining unit 703 is configured to start the first timer, and restart the first timer if the terminal device detects, at any first indication signal monitoring moment, the first indication signal for indicating that the downlink control channel is monitored at the downlink control channel monitoring moment; if the terminal device does not detect the first indication signal for indicating that the downlink control channel is monitored at the downlink control channel monitoring moment, the first timer keeps timing; if the first timer expires, the terminal device switches the receiving bandwidth corresponding to the downlink signal to the first receiving bandwidth.

In an implementation, the second determining unit 703 is configured to increase a count of the first timer, if the terminal device does not detect, at one first indication signal monitoring moment, the first indication signal for indicating that the downlink control channel is monitored at the downlink control channel monitoring moment.

In an implementation, first duration information of the first timer is configured by a network device; or, first duration information of the first timer is preconfigured.

In an implementation, after the terminal device switches the receiving bandwidth corresponding to the downlink signal from the first receiving bandwidth to the second receiving bandwidth, the second determining unit determines based on the first timer that the receiving bandwidth corresponding to the downlink signal is the first receiving bandwidth or the second receiving bandwidth.

Those skilled in the art should understand that the relevant description of the above apparatus for determining a transmission resource of the implementation of the present disclosure may be understood with reference to the relevant description of the method for determining a transmission resource of the implementation of the present disclosure.

FIG. 8 is a second schematic diagram of a flow of a method for determining a transmission resource provided by an implementation of the present disclosure. As shown in FIG. 8, the method for determining a transmission resource includes a following act.

In act 801, a terminal device determines whether to receive a second carrier based on a first downlink control channel or a first indication signal on a first carrier, wherein the first downlink control channel is able to schedule a data channel on the second carrier, the first indication signal is used for indicating whether the terminal device monitors a second downlink control channel, and the second downlink control channel is used for scheduling the data channel on the second carrier.

In the implementation of the present disclosure, the terminal device may be any device that can communicate with the network device, such as a mobile phone, a tablet computer, a vehicle-mounted terminal device, etc.

In the implementation of the present disclosure, the first carrier may be a primary carrier or a secondary carrier, the second carrier may be but not limited to an secondary carrier, and a downlink control channel on the first carrier may schedule a control channel and/or a data channel on the second carrier, so as to achieve a purpose of expanding transmission resources. The technical solution of the implementation of the present disclosure takes a first carrier scheduling a second carrier as an example. Not limited to this, the first carrier may schedule multiple second carriers, and when the first carrier schedules multiple second carriers, the scheduling of each second carrier is applicable to the technical solution of the implementation of the present disclosure.

In the implementation of the present disclosure, on the first carrier, the first downlink control channel may be transmitted, or the first indication signal (which may also be a power-saving signal) may be transmitted, wherein the first downlink control channel can schedule a data channel on the second carrier, and the first indication signal is used for indicating whether the terminal device monitors a second downlink control channel, the second downlink control channel being used for scheduling the data channel on the second carrier. Here, the first downlink control channel is transmitted at the downlink control channel monitoring moment of a search space. Similarly, the first indication signal is transmitted at a predefined first indication signal monitoring moment. It is worth noting that at each first indication signal monitoring moment, transmitting or not transmitting the first indication signal may be selected. Further, if the first indication signal is transmitted, the first indication signal may indicate to a UE to monitor a PDCCH (that is, indicate that the UE is scheduled), or may indicate to a UE not to monitor a PDCCH (that is, indicate that the UE is not scheduled). One first indication signal is associated with one or more downlink control channel monitoring moments, and the first indication signal indicates to the UE to monitor the PDCCH, which means that the first indication signal indicates to the UE to monitor the PDCCH at one or more downlink control channel monitoring moments associated with the first indication signal. Further, an association relationship between the first indication signal and one or more downlink control channel monitoring moments appears periodically in time.

In the implementation of the present disclosure, the terminal device may determine whether to receive the second carrier based on the first downlink control channel on the first carrier, or may determine whether to receive the second carrier based on the first indication signal on the first carrier, which will be described separately below.

1) Before the terminal device detects, on the first carrier, the first downlink control channel scheduling the data channel on the second carrier, the terminal device does not receive the second carrier; after the terminal device detects, on the first carrier, the first downlink control channel scheduling the data channel on the second carrier, the terminal device receives the second carrier.

Here, switching of the terminal device from a first state of not receiving the second carrier to a second state of receiving the second carrier corresponds to a fifth switching duration, wherein a time interval between the first downlink control channel detected by the terminal device under the first state and a data channel scheduled by the first downlink control channel is greater than or equal to the fifth switching duration.

2) Before the terminal device detects, on the first carrier, a first indication signal for indicating to the terminal device to monitor the second downlink control channel, the terminal device does not receive the second carrier; after the terminal device detects, on the first carrier, the first indication signal for indicating to the terminal device to monitor the second downlink control channel, the terminal device receives the second carrier.

Here, switching of the terminal device from a first state of not receiving the second carrier to a second state of receiving the second carrier corresponds to a fifth switching duration, wherein a time interval between the first indication signal for indicating to the terminal device to monitor the second downlink control channel detected by the terminal device under the first state and the second downlink control channel or a data channel scheduled by the second downlink control channel is greater than or equal to the fifth switching duration.

Here, the second downlink control channel is located on the first carrier, and the first indication signal has an association relationship with at least one second downlink control channel on the first carrier; or, the second downlink control channel is located on the second carrier, and the first indication signal has an association relationship with at least one second downlink control channel on the second carrier.

In an example, the UE detects a first indication signal on the first carrier, and the first indication signal indicates to the UE to monitor a second downlink control channel on the first carrier, and the second downlink control channel schedules a data channel on the second carrier, then the UE switches from a state of not receiving the second carrier to a state of receiving the second carrier, and for a fifth switching duration corresponding to this switching process, the fifth switching duration needs to be smaller than a time interval between the first indication signal and the data channel.

In another example, the UE detects a first indication signal on the first carrier, and the first indication signal indicates to the UE to monitor a second downlink control channel on the second carrier, and the second downlink control channel schedules a data channel on the second carrier, then the UE switches from a state of not receiving the second carrier to a state of receiving the second carrier, and for a fifth switching duration corresponding to this switching process, the fifth switching duration needs to be smaller than a time interval between the first indication signal and the second downlink control channel.

In addition, the technical solution of the implementation of the present disclosure further includes: determining based on a second timer whether to receive the second carrier. Further, after receiving the second carrier, the terminal device determines, based on the second timer, whether to cancel the receiving of the second carrier.

Here, a value of second duration information of the second timer may be a duration, or a quantity of subframes, or time slots, or PDCCH search space periods. Accordingly, timing of the second timer may be counting of time, or counting of sub-frames, or time slots, or PDCCH search space periods or first indication signal periods.

For a case of determining whether to receive the second carrier based on the first downlink control channel, the terminal device starts the second timer, and restarts the second timer if the terminal device detects, at any downlink control channel monitoring moment on the first carrier, a downlink control channel scheduling a data channel on the second carrier; if the terminal device does not detect the downlink control channel scheduling the data channel on the second carrier, the second timer keeps timing; if the second timer expires, the terminal device cancels the receiving of the second carrier. Further, if the terminal device does not detect, at one downlink control channel monitoring moment on the first carrier, the downlink control channel scheduling the data channel on the second carrier, a count of the second timer is increased.

For a case of determining whether to receive the second carrier based on the first indication signal, the terminal device starts the second timer, and restarts the second timer if the terminal device detects, at any first indication signal monitoring moment on the first carrier, the first indication signal for indicating to the terminal device to monitor the second downlink control channel; if the terminal device does not detect the first indication signal for indicating to the terminal device to monitor the second downlink control channel, the second timer keeps timing; if the second timer expires, the terminal device cancels the receiving of the second carrier. Further, if the terminal device does not detect, at one first indication signal monitoring moment on the first carrier, the first indication signal for indicating to the terminal device to monitor the second downlink control channel, a count of the second timer is increased.

In the above solution, second duration information of the second timer is configured by the network device; or, second duration information of the second timer is preconfigured.

In the above solution, in a case that the terminal device determines to receive the second carrier, the terminal device receives a first Band Width Part (BWP) of the second carrier, wherein the first BWP is a BWP in an active state for the terminal device.

It should be noted that when the second carrier is not scheduled, the terminal device may not receive the second carrier. However, if the terminal device has a requirement of receiving another signal on the second carrier, such as a configuration or synchronization requirement based on a Channel State Information (CSI) measurement and a Radio Resource Measurement (RRM), the terminal device receives the second carrier when performing the above operation. For example, when the CSI measurement is configured, when the CSI measurement needs to be performed, the second carrier is received. After the above operation is finished, and the second carrier is still not scheduled, the terminal device may continue not to receive the second carrier.

The technical solution of the implementation of the present disclosure will be illustrated below with reference to specific disclosure examples.

DISCLOSURE EXAMPLE FIVE

The terminal device receives a carrier 1, but does not receive a carrier 2. The terminal device detects a PDCCH on the carrier 1, wherein the PDCCH schedules data transmission on the carrier 2, then terminal device starts receiving the carrier 2. Here, the terminal device monitors the PDCCH at every PDCCH monitoring moment on the carrier 1, and once it detects the PDCCH scheduling the data transmission on the carrier 2, it will start receiving the carrier 2, so that not only power consumption of the terminal is saved, but also data transmission will not be missed.

In the above solution, if the terminal device determines to start receiving the carrier 2, and multiple BWPs for the terminal device are configured on the carrier 2, and one BWP thereof is in an active state, then the terminal device starts receiving data transmission on the BWP in the active state based on the carrier 2.

DISCLOSURE EXAMPLE SIX

The terminal device receives a carrier 1, but does not receive a carrier 2. The terminal device detects a power-saving signal on the carrier 1, wherein the power-saving signal indicates to monitor a PDCCH on the carrier 1, and the PDCCH schedules data transmission on the carrier 2, then terminal device starts receiving the carrier 2. Here, the terminal device monitors the power-saving signal at every power-saving signal monitoring moment on the carrier 1. Once the power-saving signal for indicating to the terminal device to monitor the PDCCH on the carrier 1 is detected, and the PDCCH schedules the data transmission on the carrier 2, the terminal device will start receiving the carrier 2, so that not only power consumption of a terminal is saved, but also data transmission will not be missed.

In the above solution, the PDCCH to be monitored indicated by the power-saving signal is located the on the carrier 1. Not limited to this, the PDCCH to be monitored indicated by the power-saving signal may be located on the carrier 2. Specifically, the terminal device detects a power-saving signal on the carrier 1, wherein the power-saving signal indicates to monitor the PDCCH located on the carrier 2, and the PDCCH schedules data transmission on the carrier 2, then the terminal device starts receiving the carrier 2. Here, the terminal device monitors the power-saving signal at every power-saving signal monitoring moment on the carrier 1. Once the power-saving signal for indicating to the terminal device to monitor the PDCCH on the carrier 2 is detected, and the PDCCH schedules the data transmission on the carrier 2, the terminal device will start receiving the carrier 2.

DISCLOSURE EXAMPLE SEVEN

In order to avoid frequently switching, by the terminal device, between whether to receive a second carrier or not, the terminal device needs to continuously receive the second carrier for a period of time after receiving the first downlink control channel or the first indication signal scheduling the second carrier. After receiving the second carrier, if the scheduling for the second carrier on the first carrier is not received for a period of time, then the terminal device may cancel the receiving of the second carrier to save power consumption.

The above requirement may be achieved based on control of the second timer (hereinafter referred to as the second timer), for example, the second timer is started after receiving the PDCCH scheduling the second carrier on the first carrier, and the terminal device cancels the receiving of the second carrier only after a new PDCCH scheduling the second carrier on the first carrier is not received for a period of time and the second timer expires. Specifically, every time the terminal device detects, on the first carrier, the PDCCH scheduling the second carrier, the terminal device restarts the second timer; if the terminal device does not detect, at one PDCCH monitoring moment on the first carrier, the PDCCH scheduling the second carrier, a count of the second timer is increased; when the second timer expires, the terminal device cancels the receiving of the second carrier.

For another example, after receiving, on the first carrier, a power-saving signal indicating to monitor the PDCCH scheduling the second carrier, the terminal device starts the second timer, and the terminal device cancels the receiving of the second carrier only after a new power-saving signal for indicating to monitor the PDCCH scheduling the second carrier is not received on the first carrier for a period of time and the second timer expires. Specifically, every time the terminal device detects, on the first carrier, the power-saving signal for indicating to monitor the PDCCH scheduling the second carrier, the terminal device restarts the second timer; if the terminal device does not detect, at one power-saving signal monitoring moment on the first carrier, the power-saving signal for indicating to monitor the PDCCH scheduling the second carrier, a count of the second timer is increased; when the second timer expires, the terminal device cancels the receiving of the second carrier.

FIG. 9 is a second schematic diagram of structure of an apparatus for determining a transmission resource provided by an implementation of the present disclosure. As shown in FIG. 9, the apparatus includes: a first determining unit 901, configured to determine whether to receive a second carrier based on a first downlink control channel or a first indication signal on a first carrier, wherein the first downlink control channel is able to schedule a data channel on the second carrier, the first indication signal is used for indicating whether the terminal device monitors a second downlink control channel, and the second downlink control channel is used for scheduling the data channel on the second carrier.

In an implementation, before the terminal device detects, on the first carrier, the first downlink control channel scheduling the data channel on the second carrier, the first determining unit 901 determines that the terminal device does not receive the second carrier; after the terminal device detects, on the first carrier, the first downlink control channel scheduling the data channel on the second carrier, the first determining unit 901 determines that the terminal device receives the second carrier.

In an implementation, the apparatus further includes: a switching unit 902; the switching unit 902 is configured to switch the terminal device from a first state of not receiving the second carrier to a second state of receiving the second carrier, wherein the switching from the first state to the second state corresponds to a fifth switching duration, wherein a time interval between the first downlink control channel detected by the terminal device under the first state and the data channel scheduled by the first downlink control channel is greater than or equal to the fifth switching duration.

In an implementation, before the terminal device detects, on the first carrier, the first indication signal for indicating to the terminal device to monitor the second downlink control channel, the first determining unit 901 determines that the terminal device does not receive the second carrier; after the terminal device detects, on the first carrier, the first indication signal for indicating to the terminal device to monitor the second downlink control channel, the first determining unit 901 determines that the terminal device receives the second carrier.

In an implementation, the apparatus further includes: a switching unit 702; the switching unit 902 is configured to switch the terminal device from a first state of not receiving the second carrier to a second state of receiving the second carrier, wherein the switching from the first state to the second state corresponds to a fifth switching duration, wherein a time interval between the first indication signal for indicating to the terminal device to monitor the second downlink control channel detected by the terminal device under the first state and the second downlink control channel or a data channel scheduled by the second downlink control channel is greater than or equal to the fifth switching duration.

In an implementation, the second downlink control channel is located on the first carrier, and the first indication signal has an association relationship with at least one second downlink control channel on the first carrier; or, the second downlink control channel is located on the second carrier, and the first indication signal has an association relationship with at least one second downlink control channel on the second carrier.

In an implementation, the apparatus further includes: a second determining unit 903, configured to determine, based on a second timer, whether to receive the second carrier.

In an implementation, after the second carrier is received by the terminal device, the second determining unit 903 determines, based on the second timer, whether to cancel the receiving of the second carrier.

In an implementation, the second determining unit 903 is configured to start the second timer, and restart the second timer if the terminal device detects, at any downlink control channel monitoring moment on the first carrier, a downlink control channel scheduling a data channel on the second carrier; if the terminal device does not detect the downlink control channel scheduling the data channel on the second carrier, the second timer keeps timing; if the second timer expires, the terminal device cancels the receiving of the second carrier.

In an implementation, the second determining unit 903 is configured to increase a count of the second timer, if the terminal device does not detects, at one downlink control channel monitoring moment on the first carrier, the downlink control channel scheduling the data channel on the second carrier.

In an implementation, the second determining unit 903 is configured to start the second timer, and restart the second timer if the terminal device detects, at any first indication signal monitoring moment on the first carrier, the first indication signal for indicating to the terminal device to monitor the second downlink control channel; if the terminal device does not detect the first indication signal for indicating to the terminal device to monitor the second downlink control channel, the second timer keeps timing; if the second timer expires, the terminal device cancels the receiving of the second carrier.

In an implementation, the second determining unit 903 is configured to increase a count of the second timer, if the terminal device does not detect, at one first indication signal monitoring moment on the first carrier, the first indication signal for indicating to the terminal device to monitor the second downlink control channel.

In an implementation, second duration information of the second timer is configured by the network device; or, second duration information of the second timer is preconfigured.

In an implementation, the apparatus further includes a transmitting unit 904, configured to receive a first Band Width Part (BWP) of the second carrier, in a case of determining to receive the second carrier, wherein the first BWP is a BWP in an active state for the terminal device.

FIG. 10 is a schematic structural diagram of a communication device 600 according to an implementation of the present disclosure. The communication device may be a terminal device. The communication device 600 shown in FIG. 10 includes a processor 610. The processor 610 may call and run a computer program from a memory to implement the method in the implementation of the present disclosure.

Optionally, as shown in FIG. 10, the communication device 600 may further include a memory 620. The processor 610 may call and run a computer program from the memory 620 to implement the method in the implementation of the present disclosure.

The memory 620 may be a separate device independent of the processor 610 or may be integrated in the processor 610.

Optionally, as shown in FIG. 10, the communication device 600 may further include a transceiver 630, and the processor 610 may control the transceiver 630 to communicate with another device. Specifically, information or data may be sent by the transceiver to another device, or information or data sent by another device is received by the transceiver.

The transceiver 630 may include a transmitter and a receiver. The transceiver 630 may further include an antenna, and the quantity of antennas may be one or more.

Optionally, the communication device 600 may specifically be a network device of the implementation of the present disclosure, and the communication device 600 may implement corresponding processes implemented by the network device in various methods of the implementations of the present disclosure, which will not be repeated here for brevity.

Optionally, the communication device 600 may be specifically a mobile terminal device/terminal device of the implementation of the present disclosure, and the communication device 600 may implement corresponding processes implemented by the mobile terminal device/terminal device in various methods of the implementations of the present disclosure, which will not be repeated here for brevity.

Figure 11:
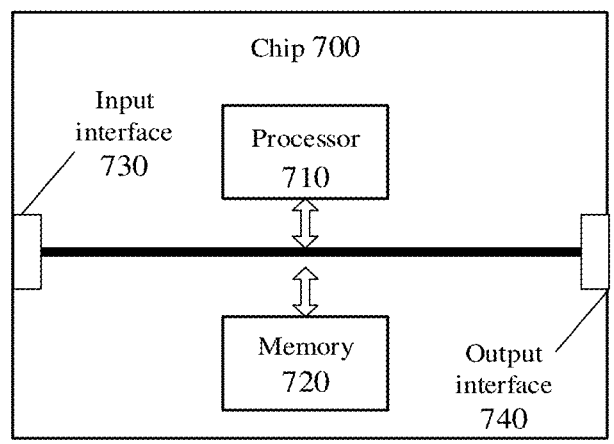
FIG. 11 is a schematic structural diagram of a chip of an implementation of the present disclosure.

FIG. 11 is a schematic structural diagram of a chip of an implementation of the present disclosure. A chip 700 shown in FIG. 11 includes a processor 710. The processor 710 may call and run a computer program from a memory to implement the method in the implementation of the present disclosure.

Optionally, as shown in FIG. 11, the chip 700 may further include a memory 720. The processor 710 may call and run a computer program from the memory 720 to implement the method in the implementation of the present disclosure.

The memory 720 may be a separate device independent of the processor 710 or may be integrated in the processor 710.

Optionally, the chip 700 may further include an input interface 730. The processor 710 may control the input interface 730 to communicate with other devices or chips. Specifically, the processor 710 may acquire information or data sent by other devices or chips.

Optionally, the chip 700 may further include an output interface 740. The processor 710 may control the output interface 740 to communicate with other devices or chips. Specifically, the processor 710 may output information or data to other devices or chips.

Optionally, the chip may be applied in a network device of the implementation of the present disclosure, and the chip may implement the corresponding processes implemented by the network device in various methods of the implementation of the present disclosure, which will not be repeated here for brevity.

Optionally, the chip may be applied in a mobile terminal device/terminal device of the implementation of the present disclosure, and the chip may implement the corresponding processes implemented by the mobile terminal device/terminal device in the various methods of the implementations of the present disclosure, which will not be repeated here for brevity.

It should be understood that the chip mentioned in the implementation of the present disclosure may be referred to as a system-level chip, a system chip, a chip system or a system-on-chip, etc.

Figure 12:
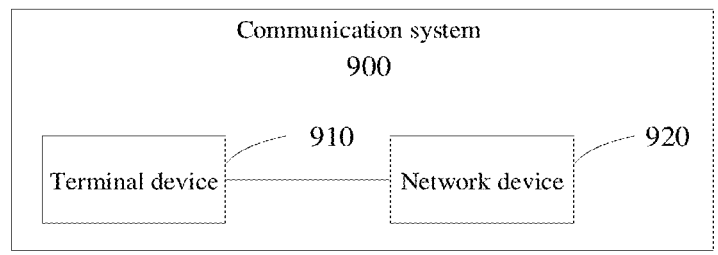
FIG. 12 is a schematic block diagram of a communication system provided by an implementation of the present disclosure.

FIG. 12 is a schematic block diagram of a communication system 900 provided by an implementation of the present disclosure. As shown in FIG. 12, the communication system 900 may include a terminal device 910 and a network device 920.

Herein, the terminal device 910 may be configured to implement the corresponding functions implemented by the terminal device in the above-mentioned method, and the network device 920 may be configured to implement the corresponding functions implemented by the network device in the above-mentioned method, which will not be repeated here for brevity.

It should be understood that, the processor in the implementation of the present disclosure may be an integrated circuit chip having a signal processing capability. In an implementation process, the steps of the foregoing method implementations may be implemented by using an integrated logic circuit of hardware in the processor or instructions in a form of software. The processor may be a general purpose processor, a Digital Signal Processing (DSP), an Disclosure Specific Integrated Circuit (ASIC), a Field Programmable Gate Array (FPGA) or another programmable logic device, a discrete gate or a transistor logic device, or a discrete hardware component. The processor may implement or perform methods, steps and logical block diagrams disclosed in the implementation of the present disclosure. The general purpose processor may be a microprocessor, or the processor may be any conventional processor or the like. The steps of the method disclosed with reference to this implementation of this disclosure may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above method in combination with its hardware.

It may be understood that, the memory in the implementation of the present disclosure may be a volatile memory or a non-volatile memory, or may include both a volatile memory and a non-volatile memory. The non-volatile memory may be a Read-Only Memory (ROM), a Programmable ROM (PROM), an erasable programmable read-only memory (EPROM), an electrically erasable programmable read-only memory (EEPROM), or a flash memory. The volatile memory may be a Random Access Memory (RAM), which is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memories in the systems and methods described in this disclosure are intended to include but not limited to these and any other suitable types of memories.

It should be understood that, the foregoing memory is an example for illustration and should not be construed as limitation. For example, optionally, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, memories in the implementations of the present disclosure are intended to include, but are not limited to, these and any other suitable types of memories.

An implementation of the present disclosure further provides a computer readable storage medium configured to store a computer program.

Optionally, the computer readable storage medium may be applied in a network device of the implementation of the present disclosure, and the computer program causes a computer to perform corresponding processes implemented by the network device in various methods of the implementations of the present disclosure, which will not be repeated here for brevity.

Optionally, the computer readable storage medium may be applied in a mobile terminal device/terminal device of the implementation of the present disclosure, and the computer program causes a computer to perform corresponding processes implemented by the mobile terminal device/terminal device in various methods of the implementations of the present disclosure, which will not be repeated here for brevity.

An implementation of the present disclosure also provides a computer program product including computer program instructions.

Optionally, the computer program product may be applied in a network device of the implementation of the present disclosure, and the computer program instructions cause a computer to perform corresponding processes implemented by the network device in various methods of the implementations of the present disclosure, which will not be repeated here for brevity.

Optionally, the computer program product may be applied in a mobile terminal device/terminal device of the implementation of the present disclosure, and the computer program instructions cause a computer to perform corresponding processes implemented by the mobile terminal device/terminal device in various methods of the implementations of the present disclosure, which will not be repeated here for brevity.

An implementation of the present disclosure also provides a computer program.

Optionally, the computer program may be applied in a network device of the implementation of the present disclosure. When the computer program is running on a computer, the computer is caused to perform corresponding processes implemented by the network device in various methods of the implementations of the present disclosure, which will not be repeated here for brevity.

Optionally, the computer program may be applied in a mobile terminal device/terminal device of the implementation of the present disclosure. When the computer program is running on a computer, the computer is caused to perform corresponding processes implemented by the mobile terminal device/terminal device in various methods of the implementations of the present disclosure, which will not be repeated here for brevity.

Those of ordinary skill in the art will recognize that the exemplary units and algorithm acts described in combination with the implementations disclosed herein may be implemented in electronic hardware, or a combination of computer software and electronic hardware. Whether these functions are implemented in hardware or software depends on the specific disclosure and design constraints of the technical solution. Skilled artisans may use different methods to implement the described functions in respect to each particular disclosure, but such implementation should not be considered to be beyond the scope of the present disclosure.

Those skilled in the art may clearly understand that for convenience and conciseness of description, the specific working processes of the systems, apparatuses and units described above may refer to the corresponding processes in the method implementations and will not be described here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various implementations of the present disclosure. The foregoing storage medium includes: any medium that can store program code, such as a USB flash drive, a removable hard disk, a Read-Only Memory (ROM), a Random Access Memory (RAM), a magnetic disk, or an optical disc.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

What is claimed is:

1. A method for determining a transmission resource, comprising:
   determining, by a terminal device, a first receiving bandwidth corresponding to a downlink signal based on a bandwidth of a first control resource set or a bandwidth of a first indication signal, wherein the first control resource set is used for transmitting a downlink control channel, and the first indication signal is used for the terminal device to determine whether to monitor the downlink control channel at a downlink control channel monitoring moment,
   wherein the first receiving bandwidth is greater than or equal to the bandwidth of the first control resource set, and
   wherein the first receiving bandwidth is greater than or equal to the bandwidth of the first indication signal.

2. The method according to claim 1, wherein determining, by the terminal device, the first receiving bandwidth corresponding to the downlink signal based on the bandwidth of the first control resource set, comprises:
   before detecting, by the terminal device, a first downlink control channel for the terminal device, determining, by the terminal device, the first receiving bandwidth corresponding to the downlink signal based on the bandwidth of the first control resource set.

3. The method according to claim 2, wherein the method further comprises:

after detecting, by the terminal device, the first downlink control channel for the terminal device, determining, by the terminal device, a second receiving bandwidth corresponding to the downlink signal based on a bandwidth of a Band Width Part (BWP) currently in an active state.

4. The method according to claim 3, wherein the method further comprises:
after detecting, by the terminal device, the first downlink control channel for the terminal device, switching a receiving bandwidth corresponding to the downlink signal from the first receiving bandwidth to the second receiving bandwidth, wherein the switching from the first receiving bandwidth to the second receiving bandwidth of the terminal device corresponds to a first switching duration, and a time interval between the first downlink control channel detected by the terminal device based on the first receiving bandwidth and a first downlink data channel scheduled by the first downlink control channel is greater than or equal to the first switching duration.

5. The method according to claim 1, wherein determining, by the terminal device, the first receiving bandwidth corresponding to the downlink signal based on the bandwidth of the first indication signal, comprises:
before detecting, by the terminal device, the first indication signal used for indicating that the downlink control channel is monitored at the downlink control channel monitoring moment, determining, by the terminal device, the first receiving bandwidth corresponding to the downlink signal based on the bandwidth of the first indication signal.

6. The method according to claim 5, wherein the method further comprises:
after detecting, by the terminal device, the first indication signal used for indicating that the downlink control channel is monitored at the downlink control channel monitoring moment, determining, by the terminal device, a second receiving bandwidth corresponding to the downlink signal based on a bandwidth of a BWP currently in an active state; or
after detecting, by the terminal device, the first indication signal used for indicating that the downlink control channel is monitored at the downlink control channel monitoring moment, determining, by the terminal device, a third receiving bandwidth corresponding to the downlink signal based on the bandwidth of the first control resource set; after detecting, by the terminal device, a first downlink control channel for the terminal device on the third receiving bandwidth, determining, by the terminal device, a second receiving bandwidth corresponding to the downlink signal based on a bandwidth of a BWP currently in an active state.

7. The method according to claim 6, wherein the method further comprises:
after detecting, by the terminal device, the first indication signal used for indicating that the downlink control channel is monitored at the downlink control channel monitoring moment, switching a receiving bandwidth corresponding to the downlink signal from the first receiving bandwidth to the second receiving bandwidth, wherein the switching from the first receiving bandwidth to the second receiving bandwidth of the terminal device corresponds to a second switching duration, and a time interval between the first indication signal detected by the terminal device based on the first receiving bandwidth and the downlink control channel monitoring moment associated with the first indication signal is greater than or equal to the second switching duration; or,
after detecting, by the terminal device, the first indication signal used for indicating that the downlink control channel is monitored at the downlink control channel monitoring moment, switching a receiving bandwidth corresponding to the downlink signal from the first receiving bandwidth to the third receiving bandwidth, and after detecting, by the terminal device, the first downlink control channel for the terminal device on the third receiving bandwidth, switching the receiving bandwidth corresponding to the downlink signal from the third receiving bandwidth to the second receiving bandwidth, wherein the switching from the first receiving bandwidth to the third receiving bandwidth of the terminal device corresponds to a third switching duration, the switching from the third receiving bandwidth to the second receiving bandwidth of the terminal device corresponds to a fourth switching duration, a time interval between the first indication signal detected by the terminal device based on the first receiving bandwidth and the downlink control channel monitoring moment associated with the first indication signal is greater than or equal to the third switching duration, and a time interval between the first downlink control channel detected by the terminal device based on the third receiving bandwidth and a first downlink data channel scheduled by the first downlink control channel is greater than or equal to the fourth switching duration.

8. The method according to claim 7, wherein the first indication signal has an association relationship with at least one downlink control channel monitoring moment, wherein the association relationship between the first indication signal and the at least one downlink control channel monitoring moment appears periodically in time.

9. The method of claim 1, wherein
if a plurality of configured search spaces of the terminal device have overlapping parts in time or time intervals among the plurality of configured search spaces in time are less than or equal to a first threshold value, determining, by the terminal device, the first receiving bandwidth of the downlink signal based on first bandwidths of the first control resource sets corresponding to the plurality of search spaces respectively.

10. The method according to claim 9, wherein determining, by the terminal device, the first receiving bandwidth of the downlink signal based on the first bandwidths of the first control resource sets corresponding to the plurality of search spaces respectively, comprises:
determining, by the terminal device, that the first receiving bandwidth of the downlink signal covers the first bandwidths of the first control resource sets corresponding to all the plurality of search spaces respectively.

11. The method according to claim 10, wherein
within a time range in which the plurality of search spaces overlap in time, the first receiving bandwidth of the downlink signal covers the first bandwidths of the first control resource sets corresponding to all the plurality of search spaces respectively; or,
within a time range in which the time intervals among the plurality of search spaces in time are less than or equal to the first threshold value, the first receiving bandwidth of the downlink signal covers the first bandwidths of the first control resource sets corresponding to all the plurality of search spaces respectively.

12. The method according to claim 1, wherein the method further comprises:
determining based on a first timer that a receiving bandwidth corresponding to the downlink signal is the first receiving bandwidth or a second receiving bandwidth, wherein the second receiving bandwidth is determined based on a bandwidth of a BWP currently in an active state.

13. The method according to claim 12, wherein determining based on the first timer that the receiving bandwidth corresponding to the downlink signal is the first receiving bandwidth or the second receiving bandwidth, comprises:
starting, by the terminal device, the first timer, and restarting the first timer if the terminal device detects a downlink control channel at any downlink control channel monitoring moment; wherein if the terminal device does not detect a downlink control channel, the first timer keeps timing; and
if the first timer expires, switching, by the terminal device, the receiving bandwidth corresponding to the downlink signal from the second receiving bandwidth to the first receiving bandwidth.

14. The method according to claim 13, wherein if the terminal device does not detect the downlink control channel, the first timer keeps timing, comprises:
if the terminal device does not detect a downlink control channel at one downlink control channel monitoring moment, a count of the first timer is increased.

15. The method according to claim 12, wherein determining based on the first timer that the receiving bandwidth corresponding to the downlink signal is the first receiving bandwidth or the second receiving bandwidth, comprises:
starting, by the terminal device, the first timer, and restarting the first timer if the terminal device detects, at any first indication signal monitoring moment, the first indication signal for indicating that the downlink control channel is monitored at the downlink control channel monitoring moment; wherein if the terminal device does not detect the first indication signal for indicating that the downlink control channel is monitored at the downlink control channel monitoring moment, the first timer keeps timing; and
if the first timer expires, switching, by the terminal device, the receiving bandwidth corresponding to the downlink signal to the first receiving bandwidth.

16. The method according to claim 15, wherein, if the terminal device does not detect the first indication signal for indicating that the downlink control channel is monitored at the downlink control channel monitoring moment, the first timer keeps timing, comprises:
if the terminal device does not detect, at one first indication signal monitoring moment, the first indication signal for indicating that the downlink control channel is monitored at the downlink control channel monitoring moment, a count of the first timer is increased.

17. The method of claim 12, wherein
first duration information of the first timer is configured by a network device; or,
first duration information of the first timer is preconfigured.

18. The method according to claim 12, wherein determining based on the first timer that the receiving bandwidth corresponding to the downlink signal is the first receiving bandwidth or the second receiving bandwidth, comprises:
after switching the receiving bandwidth corresponding to the downlink signal from the first receiving bandwidth to the second receiving bandwidth, determining, by the terminal device, based on the first timer that the receiving bandwidth corresponding to the downlink signal is the first receiving bandwidth or the second receiving bandwidth.

19. A terminal device, comprising a processor and a memory, wherein the memory is configured to store a computer program, and the processor is configured to call and run the computer program stored in the memory to execute:
determining whether to receive a second carrier based on a first downlink control channel or a first indication signal on a first carrier, wherein the first downlink control channel is able to schedule a data channel on the second carrier, the first indication signal is used for indicating whether the terminal device monitors a second downlink control channel, and the second downlink control channel is used for scheduling the data channel on the second carrier,
wherein a receiving bandwidth of the terminal device is greater than or equal to a bandwidth of the first indication signal.

20. The terminal device according to claim 19, wherein determining whether to receive the second carrier based on the first downlink control channel on the first carrier, comprises:
before detecting on the first carrier, the first downlink control channel scheduling the data channel on the second carrier, not receiving the second carrier; and
after detecting on the first carrier, the first downlink control channel scheduling the data channel on the second carrier, receiving the second carrier.

21. The terminal device according to claim 20, wherein switching of the terminal device from a first state of not receiving the second carrier to a second state of receiving the second carrier corresponds to a fifth switching duration, wherein a time interval between the first downlink control channel detected by the terminal device under the first state and the data channel scheduled by the first downlink control channel is greater than or equal to the fifth switching duration.

22. The terminal device according to claim 19, wherein determining whether to receive the second carrier based on the first indication signal on the first carrier, comprises:
before detecting on the first carrier, the first indication signal for indicating to the terminal device to monitor the second downlink control channel, not receiving the second carrier; and
after detecting on the first carrier, the first indication signal for indicating to the terminal device to monitor the second downlink control channel, receiving the second carrier.

23. The terminal device according to claim 22, wherein switching of the terminal device from a first state of not receiving the second carrier to a second state of receiving the second carrier corresponds to a fifth switching duration, wherein a time interval between the first indication signal for indicating to the terminal device to monitor the second downlink control channel detected by the terminal device under the first state and the second downlink control channel or a data channel scheduled by the second downlink control channel is greater than or equal to the fifth switching duration.

24. The terminal device according to claim 19, wherein the processor is further configured to call and run the computer program stored in the memory to execute:
   determining, based on a second timer, whether to receive the second carrier,
   wherein determining, based on the second timer, whether to receive the second carrier, comprises:
   after receiving the second carrier, determining based on the second timer, whether to cancel the receiving of the second carrier.

25. The terminal device according to claim 24, wherein after receiving the second carrier, determining based on the second timer, whether to cancel the receiving of the second carrier, comprises:
   starting the second timer, and restarting the second timer if the terminal device detects, at any downlink control channel monitoring moment on the first carrier, a downlink control channel scheduling the data channel on the second carrier; wherein if the terminal device does not detect the downlink control channel scheduling the data channel on the second carrier, the second timer keeps timing; and
   if the second timer expires, canceling the receiving of the second carrier.

* * * * *